United States Patent [19]

Young et al.

[11] 4,430,451
[45] Feb. 7, 1984

[54] LOW DENSITY, MICROCELLULAR FOAMS, PREPARATION, AND ARTICLES

[75] Inventors: Ainslie T. Young, Los Alamos; Robert G. Marsters, Jemez Springs; Dawn K. Moreno, Espanola, all of N. Mex.

[73] Assignee: The United States of America as represented by the United States Department of Energy, Washington, D.C.

[21] Appl. No.: 354,553

[22] Filed: Mar. 3, 1982

[51] Int. Cl.$^3$ ................................................ C08J 9/26
[52] U.S. Cl. ........................................ 521/64; 264/49; 521/61; 521/143; 524/486; 524/579
[58] Field of Search .................. 524/579, 486; 521/61, 521/64

[56] References Cited

U.S. PATENT DOCUMENTS 3,029,215 4/1962 Campbell ............................ 524/579
3,308,073 3/1967 Kepple .................................. 521/64
3,607,793 9/1971 Mahlmas .............................. 521/64

OTHER PUBLICATIONS

"Prep. of Multishell ICF Target Plastic Foam Cushion Materials by Thermally Induced Phase Inversion Processes", by Young et al., pp. 1–9.

Primary Examiner—Morton Foelak
Attorney, Agent, or Firm—Paul D. Gaetjens; William A. Eklund

[57] ABSTRACT

A microcellular low density foam of poly(4-methyl-1-pentene) which is particularly useful for forming targets for inertial confinement fusion has been developed. Articles made from the foam have been machined to tolerances of 0.0001 inch, although the densities of the fragile foam are low (about 10 to about 100 mg/cc) and the cell sizes are small (about 10 to about 30 $\mu$m). Methods for forming the foam and articles are given; and the yield strength of the foam of the invention is higher than was obtained in other structures of this same material.

9 Claims, No Drawings

LOW DENSITY, MICROCELLULAR FOAMS, PREPARATION, AND ARTICLES

The invention is a result of a contract with the Department of Energy (Contract No. W-7405-ENG-36).

BACKGROUND OF THE INVENTION

The present invention relates generally to solid plastic foams, to articles of manufacture produced from such foams, and to methods of producing such foams and articles and relates more particularly to an improved foam made of poly(4-methyl-1-pentene), to articles of manufacture produced therefrom, and to methods of producing the foam and the articles of manufacture.

In laser fusion studies, there has been a need for multishell fusion targets in which the concentricity between the inner and outer shells does not vary over a 2% range. Also needed between the two shells was a cushion layer having low atomic number (i.e., low-Z). For some studies in inertial confinement fusion (i.e., ICF), it was desired that the cushion layer be formed from small cell plastic foam having low-Z, low density, and cell size of 10 to 30 $\mu$m and being made of a material containing only carbon and hydrogen.

Because poly(4-methyl-1-pentene) contains only carbon and hydrogen and has a lower bulk density (and hence will form low density foam more readily) than other hydrocarbon polymers (for example, polyethylene, polystyrene, etc.) low density microcellular foams of poly(4-methyl-1-pentene) were desired for ICF targets; however, it was also a requirement that the foam be machined into structures to tolerances of 0.0001 inch (without any defects larger than 0.0001 inch).

In the prior art, many patents have disclosed forming foams of poly(4-methyl-1-pentene).

In U.S. Pat. No. 3,378,507 to Sargent et al., "Producing Microporous Polymers," a process for producing solid, microporous hydrocarbon polymers (including 4-methyl-1-pentene) and products are disclosed. Water-soluble, anionic surfactant (which is preferably a solid) is incorporated into solid, thermoplastic polymer, thus forming a porous structure. Thereafter, the surfactant is removed from the structure. However, due to the use in Sargent et al. of no more than 90% by weight of surfactant in the total weight of surfactant and hydrocarbon polymers, the density of the resulting structures will be higher than was required for ICF targets; and in Sargent et al. there was no disclosure of machinable microcellular foam having a density within the range from about 10 to about 100 mg/cc. No incentive was there provided for forming a very low density structure. Instead, the patent appeared to teach away from such a structure by the statement (at col. 6) that if the amount of surfactant used is greater than 90%, the hydrocarbon structure left after extraction is extremely porous and too weak to be of any utility.

In U.S. Pat. No. 4,247,498 to Castro, poly(4-methyl-1-pentene) is disclosed as one of many polymers which can be used to form microporous polymer products. With the polymer is mixed a compatible material which is generally a liquid at ambient temperatures. However, as disclosed in Castro, materials which are solid at room temperature may be employed, so long as they can form solutions with the polymer at elevated temperatures and so long as they do not interfere with the formation of the microporous structure. More specifically, a solid material may be used, provided that phase separation occurs by liquid-liquid separation rather than liquid-solid separation during the cooling step. In examples 244 and 255 of Castro, methylpentene (which is believed to be the same material as poly(4-methyl-1-pentene) was used in the standard preparation procedure of Castro. In Table X of Castro, twelve compatible materials are given for the polymer, one of which (naphthalene) was a solid at room temperature. However, the Castro patent clearly emphasizes using a liquid, and no incentive is provided for using the particular material which is used in the method of the present invention (described below).

Following Castro's method, one obtains plastic foam objects by allowing the solution of polymer and compatible liquid at an elevated temperature "to assume a desired shape" and "cooling said solution in said desired shape at a rate and to a temperature sufficient to initiate thermodynamic, non-equilibrium liquid-liquid phase separation" (as claimed in claim 1 of Castro and as disclosed in the specification at column 15 at lines 26-36, where further processing of blocks of the microporous material includes conventional extrusion, injection molding or other related techniques). However, in cooling the polymer within a mold, the solution generally will shrink in size at a rate different from that of the mold due to differences in the coefficients of thermal expansion of the polymer solution and the mold.

Therefore, by following the methods disclosed in Castro, one cannot produce final foam objects to very tight tolerances; and objects of only rough final dimensions will be obtained. Furthermore, the foams which are formed by the process of Castro are very delicate; and, thus, any fabrication method which involves mechanical contact with the foam usually has distorted, damaged, or destroyed the foam structure.

In U.S. Pat. No. 2,671,953 to Balke, "Metal Body of High Porosity," a porous metallic body was impregnated with a wax; and then the body was sawed into blanks and turned in a lathe. Thereafter, the wax was volatilized from the metal body. This patent, however, did not address any materials other than metals.

Therefore, despite what has been known in the prior art, a need has existed for low density, microcellular articles of manufacture consisting of poly(4-methyl-1-pentene) and machined to tolerances of 0.0001 inch.

SUMMARY OF THE INVENTION

Objects of this invention are articles of manufacture which have been machined to tolerances of 0.0001 inch (and thus which have no defects with linear dimensions larger than 0.0001 inch) and which are made of low density (i.e. about 10 to about 100 mg/cc) foam of poly(4-methyl-1-pentene) with cell size of about 10 to about 30 $\mu$m.

Another object of this invention is a method for making the above-described machined articles of manufacture.

A further object of this invention is a composition of matter comprising a low density foam of poly(4-methyl-1-pentene) having relatively uniform cell sizes of about 10 to about 30 $\mu$m and being machinable to 0.0001 inch tolerances.

Yet another object of this invention is a foam of poly(4-methyl-1-pentene) which is microcellular and low density and which has a higher strength due to the structure of the foam than was obtained in other structures of this same material.

A still further object of this invention is a method for making the composition of matter comprising the microcellular foam of poly(4-methyl-1-penetene) described above.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of this invention of forming a machinable composition of matter comprising a microcellular, low density foam of poly(4-methyl-1-pentene) comprises: (1) forming a mixture of poly(4-methyl-1-pentene) and a solvent comprising bibenzyl (i.e., 1,2-diphenylethane) such that the relative percent by weight of poly(4-methyl-1-pentene) in the mixture is within the range from about 1.0 to about 10.0 and the relative percent by weight of solvent in the mixture is within the range from about 99.0 to about 90.0; (2) heating the mixture to a temperature sufficient so that complete solution of the two ingredients occurs (about 220° C.); (3) pouring the mixture into a mold, if desired, cooling it down to a temperature of about 180° C. (i.e., 178°-182° C.), and maintaining that temperature for a period of time sufficient to enable the system to come to temperature equilibrium; (4) then, cooling the mixture from about 180° C. at a rate within the range from about 0.9 to about 1.1° C. per minute down to about 160° C., thereby allowing reverse phase separation to occur at a particular rate within this temperature range; (5) holding the mixture at about 160° C. (i.e., 158°-162° C.) for a period of time sufficient to enable the system to come to temperature equilibrium; and (6) then cooling the gelatinous mass down to room temperature, thus solidifying both the polymer and the bibenzyl. It has been found that the cooling rate from 180° C. to 160° C. critically influences the foam which results and that the strength of the resulting foam is a maximum when the cooling rate is within the range from about 0.9° to 1.1° C. per minute for the foam of poly(4-methyl-1-pentene). Furthermore, for mixtures consisting of poly(4-methyl-1-pentene) and bibenzyl described in Example 3 below, it has been found that at a cooling rate of 0.7° C. per minute, a rosette-shaped structure forms, whereas at a cooling rate of 1.0° C. per minute, the desired microcellular, low density foam formed.

The solvent can consist of bibenzyl or, if desired in order to avoid microcracks, described below, a small amount (less than about 15% by weight of solvent) of cosolvent (e.g. paraffin waxes) can be substituted for an equivalent amount of the bibenzyl in the solvent used in the method described above.

In the process of the invention, the bibenzyl (or mixture of bibenzyl and paraffin) serves both (1) as the solvent which forms the polymer matrix and (2) as a reinforcement agent for the foam so that the fragile foam can be machined. Although reinforcing agents have been used in the prior art, such as wax described for metals in the Balke patent mentioned above, it is believed that the method of using bibenzyl both as an essential ingredient in the solvent for forming the polymer matrix and as a reinforcing agent in the polymer matrix is new and leads to several advantages, described below. Furthermore, it is believed that the foam of poly(4-methyl-1-pentene) produced by the method recited above which contains the solid bibenzyl (or bibenzyl and paraffin) is a new and useful composition of matter because the foam can be machined and the bibenzyl (or bibenzyl and paraffin) can be removed subsequently therefrom by extraction (described below). And, most importantly, it is believed that the machined articles of manufacture consisting of the foam of poly(4-methyl-1-pentene) having cell sizes of about 10 to about 30 $\mu$m and having a density within the range from about 10 to about 100 mg/cc (as is produced in the method described above) is new, very useful, and unobvious. Although foams of various polyolefins have been formed in the prior art, it is believed that foam of poly(4-methyl-1-pentene) having this particular range of cell sizes and this particular range of densities has not previously existed. Furthermore, it is believed that machined articles of manufacture with tolerances to within 0.0001 inch of foam of poly(4-methyl-1-pentene) with this particular cell size and density have not previously existed.

DETAILED DESCRIPTION OF PREFERRED EMBODIMENTS OF THE INVENTION

In the method of the invention of making the microcellular, low density foam of poly(4-methyl-1-pentene), a mixture of poly(4-methyl-1-pentene) and a solvent comprising bibenzyl is made in the first step. The relative percent by weight of poly(4-methyl-1-pentene) in the mixture will be within the range from about 1.0 to about 10.0 and the relative percent by weight of solvent in the mixture will be within the range from about 99.0 to about 90.0.

Incorporation of a small amount of cosolvent such as a paraffin wax which does not depress the melting point of the main solvent (i.e., bibenzyl) has been found to have a beneficial effect on the quality of the final foam material. When bibenzyl is used alone as the solvent in the process, the sample develops microcracks during the process. These microcracks largely result from the thermal contraction of the sample as it cools. The presence of paraffin waxes in bibenzyl has been found to essentially eliminate the microcrack formation without affecting the machinability and cellular structure of the sample. It is expected that other aliphatic hydrocarbons having molecular weights greater than 200 and less than 1000 would have a similar effect. An amount of 15 weight percent or greater (based on the total solvent weight of 100%) has been found to result in deterioration of the cellular structure (see Table II in Example 3 below) and, thus, decline in the yield strength of the foam. Therefore, an amount less than 15 weight percent of paraffin waxes in bibenzyl is preferred for forming the cell structure of the invention.

The poly(4-methyl-1-pentene) is commercially available from Mitsui Petrochemical Industries, Ltd., under the tradename TPX and contains less than 5% by weight of other monomer impurities. It has been found that best results were obtained when the poly(4-methyl-1-pentene) had the highest available molecular weight (described in Example 1).

In the method of the invention, the mixture described above is then heated to a temperature sufficient so that complete solution of the two ingredients occurs. This will be a temperature within the range of about 220° C.

to about 240° C. Next, the heated materials are cooled down to a temperature of about 180° C. (i.e., within the range from about 178° to about 182° C.); and that temperature is maintained for a period of time sufficient to enable the system to come to temperature equilibrium.

Next, the heated materials are cooled down from about 180° C. at a rate such that non-equilibrium liquid-liquid phase separation occurs. It has been experimentally found for this system of poly(4-methyl-1-pentene) and bibenzyl that the cooling rate must be about 1° C. per minute (i.e., within the range from about 0.9° to about 1.1° C. per minute) when the desired foam structure is to have a thickness in the range of about 10 mm to about 4 cm in order for the desired foam to form. This required cooling rate could not have been predicted. For the range of thicknesses of 10 mm to 4 cm, when the cooling rate was about 0.7° C. per minute, a rosette-shaped structure formed in some instances and a platelet-shaped structure formed in other instances, instead of the desired foam. These three structures have different yield strengths, described below in Example 3. Cooling rates greater than 1° C. per minute favor formation of a cellular foam structure; but because of the thermal conductivity of the mixture, cooling rates greater than 1° C. per minute usually result in non-uniformity in cell size distribution.

When the foam structure is to have a thickness outside the range of 10 mm to 4 cm, a cooling rate faster than 1° C. per minute can be used for thinner samples but 1° C. per minute must be used for thicker samples in order to obtain the desirable cell structure, described above.

Next, when the materials have cooled down to about 160° C. (i.e., within the range from 158° to 162° C.), the mixture must be held at that temperature for a period of time sufficient to enable the system to come to temperature equilibrium. Thereafter, the gelatinous mass is cooled down to room temperature; and the polymer-bibenzyl mixture is solidified.

Because the bibenzyl is a solid at room temperature, it will act as a reinforcing agent for the fragile foam of poly(4-methyl-1-pentene). The foam housing the bibenzyl can then be machined to tolerances of 0.0001 inch.

The bibenzyl can be leached from the foam of (poly(4-methyl-1-pentene) by any suitable leaching procedure, using any suitable solvent. For example, methanol at room temperature will leach out substantially all of the bibenzyl from a foam object of a size up to 50 mm (largest linear dimension) within a period of time of about 5 days without changing the dimensions of the object. The solvent chosen and the leaching procedure chosen should be such that they do not significantly affect the poly(4-methyl-1-pentene) in any way; any low molecular weight alcohol used at about room temperature is expected to give good results.

By following the method of the invention, the resulting final foam objects will thus have been formed to very tight tolerances and very precise final dimensions.

In the method of making the foam, once the initial mixture is formed, no further mixing or agitation is needed or desired. The non-equilibrium liquid-liquid phase separation occurs spontaneously to form the desired foam.

The foam of the invention is characterized by having the following combination of properties, the combination of which is believed not to have existed in any foam previously produced. The cell size is quite uniform and the individual cells range in size from about 10 to about 30 μm as the largest linear dimension in a given sample. The density of the foam generally varies no more than ±4% across the sample and for a given sample will be within the range from about 10 to about 100 mg/cc. The yield strength of the foam of the invention is also a characteristic of the foam and was found to lie within the range from about 1 to about 12 psi for a foam of density of 50 mg/cc. For foams of density of 10 mg/cc, the yield strength is expected to be about 1 psi; and for foams of density of 100 mg/cc, the yield strength is expected to be significantly higher than the yield strength for the 50 mg/cc samples. The yield strength of the foam depends upon the cooling rate at which the foam cools down from 180° to 160° C. and has been found to be a maximum when the cooling rate is 1° C. per minute.

The articles prepared from the foam are characterized by being machinable to tolerances of 0.0001 inch and formed from poly(4-methyl-1-pentene), with the foam having the characteristics as described above.

EXAMPLE 1

Into a 30 ml glass beaker was placed 20.79 g of bibenzyl (1,2-diphenylethane, m.p.=49.6° C.) and the bibenzyl was melted on a hot plate with stirring. The temperature of the melt was then raised to about 200° C., at which temperature 1.21 g of TPX (poly(4-methyl-1-pentene), melt index=8, average molecular weight=216,000) pellets were added. The mixture was then heated to about 215° C. with stirring until all the TPX had dissolved in the bibenzyl.

The stir bar was removed, and the solution was poured into a hot 25 ml round bottom flask suspended in a temperature programmable oven at 220° C. The temperature of the oven was dropped to 180° C., where it was held for about 45 minutes to allow the temperature to equilibrate. The oven was then cooled to 160° C. over a period of 20 minutes and held at that temperature for 24 minutes. It was during this step that phase separation occurred between the polymer and the solvent. The sample was then cooled slowly to 48° C. (which is about 1° C. below the melting point of bibenzyl) and held at this temperature until the sample had come to temperature equilibrium. This temperature was chosen to avoid supercooling of the bibenzyl and to allow crystallization to proceed without building in any appreciable stress in the sample mixture. For some batches, some means of crystallizing the solvent may be needed; and if so, any standard means of seeding the crystals can be used. For example, a crystal of bibenzyl can be added to seed the solidification of the solvent at this point. The oven was then cooled to room temperature.

A hemispherical shell of I.D. 10 mm and O.D. 35 mm was fabricated from the foam on a diamond tip lathe to tolerances of 0.0001 inch. The hemispherical shell was then placed in a fritted cup in a Soxhlet extractor, and the bibenzyl was removed from the TPX polymer matrix by continuously washing for 3 days with methyl alcohol. Care was taken to keep the temperature of the methyl alcohol around 25° C. in order to minimize dimensional changes in the foam structure.

The density of the dried, open cell foam shell was 0.060 g/cm$^3$ and the average mean free path between the walls and/or ribs (cell size) was 15-20 μm. Dimensional variation was less than 0.0001 inch, and the shell had a yield strength of about 8 lbs/sq. in.

EXAMPLE 2

Into a 1-liter beaker was placed 408.25 g of bibenzyl and 45.36 g of commercial paraffin wax. The mixture was melted with stirring and the temperature of the resulting liquid was raised to about 200° C. 26.40 g of TPX (as in Example 1) was added, and the contents of the beaker were heated to 220° C. with stirring. After the polymer had gone into solution the stir bar was removed, and the contents were poured into 12 25-ml round-bottomed flasks preheated to 220° C. in the oven used in Example 1. The samples were cooled as described in Example 1 to room temperature.

Six cooled samples were fabricated into right circular cylinders, and the bibenzyl and paraffin were extracted with isopropyl alcohol at a temperature of 25° C. over a period of 172 hours.

X-ray radiographs of the dried, open cell foam cylinders showed no defects such as voids or areas of high density material in the cylinders. Maximum density variation from the radiographs was calculated to be ±4% on an image analyzer. Cell size was found to be 25 $\mu m \pm 5$ $\mu m$ via scanning electron microscopy analysis.

Dimensional variation in the samples before and after leaching was found to vary no more than 0.001%. The densities of the 6 samples are recorded in Table I.

The densities are quite low, yet the foam samples have been found to be useful in the manufacture of ICF targets.

TABLE I

| Sample # | Diameter Cylinder (cm) | Height Cylinder (cm) | Weight Cylinder (g) | Density Foam (g/cc) |
| --- | --- | --- | --- | --- |
| 1 | 1.5852 | 1.4118 | 0.15014 | 0.0539 |
| 2 | 1.5814 | 1.2608 | 0.13319 | 0.0538 |
| 3 | 1.5736 | 1.3114 | 0.14801 | 0.0580 |
| 4 | 1.5545 | 1.4016 | 0.14954 | 0.0562 |
| 5 | 1.5656 | 1.3834 | 0.14984 | 0.0563 |
| 6 | 1.6026 | 1.2948 | 0.14675 | 0.0562 |

EXAMPLE 3

In this example, the basic method used in Example 2 was carried out, except that here the weight percent of paraffin wax in bibenzyl was varied as shown in Table II. The resulting cell structure and notation of presence or absence of microcracks is there also summarized.

TABLE II

| Run # | Weight Percent Paraffin Wax in Bibenzyl | Cell Structure | Comments |
| --- | --- | --- | --- |
| 1 | 0 | Cellular | Microcracks |
| 2 | 5 | Cellular | No Microcracks |
| 3 | 10 | Cellular | No Microcracks |
| 4 | 15 | Platelet | No Microcracks |
| 5 | 20 | Platelet-Rosette | No Microcracks |

The results in Table II indicate that an amount less than 15 but greater than 0 weight percent of paraffin waxes in bibenzyl is preferred for forming the uniform cell structure of the invention. Although not shown in the results in Table II, about 10 percent by weight of paraffin in bibenzyl was most preferred since a minimum amount of microcracking was obtained without altering the cellular structure of the foam.

EXAMPLE 4

In this example, the effect of the cooling rate of the mixture of poly(4-methyl-1-pentene) and bibenzyl on the yield strength of the resulting structure was investigated. The procedure followed in each run was the same as described in Example 1, except that the rate of cooling in the temperature region of 180° C. to 160° C. was varied as described in Table I. In run 1, a rosette-shaped structure formed; in run 2, a platelet-shaped structure formed; and in run 3, foam according to the invention formed. The yield strengths of these structures were measured by a method described in ASTM D695 and is "The Crush Load at the Failure of the Specimen Divided by the Original Sectional Area of the Specimen." The results are shown below in Table III.

TABLE III

| Run | Structure | Cooling Rate (°C./min) from 180° C. to 160° C. | Yield Strength (lb/sq. in.) |
| --- | --- | --- | --- |
| 1 | Rosettes | 0.7 | 2 |
| 2 | Platelets | 0.8 | 4–5 |
| 3 | Foam | 1.0 | 8–10 |

The results in Table III clearly indicate that the cooling rate is a critical parameter in determining structure and yield strength.

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. A method of forming a machinable composition of matter which after being leached forms a microcellular, low density foam of poly(4-methyl-1-pentene), said method comprising:
    (a) forming a mixture of poly(4-methyl-1-pentene) and solvent comprising bibenzyl such that the relative percent by weight of poly(4-methyl-1-pentene) in said mixture is within the range from about 1.0 to about 10.0 and the relative percent by weight of solvent in said mixture is within the range from about 99.0 to about 90.0;
    (b) heating said mixture to a first temperature sufficient so that complete solution of poly(4-methyl-1-pentene) and solvent occurs;
    (c) cooling said mixture down to a second temperature of about 180° C. and maintaining said second temperature for a period of time sufficient to enable said mixture to come to temperature equilibrium;
    (d) then cooling said mixture from about 180° C. at a rate within the range from about 0.9 to about 1.1° C. per minute down to a third temperature of about 160° C., thereby allowing reverse phase separation of said mixture to occur at a particular rate between said second temperature and said third temperature;
    (e) holding said mixture at said third temperature for a period of time sufficient to enable said mixture to come to temperature equilibrium; and (f) then allowing said mixture to cool down to room temperature, thus solidifying both said poly(4-methyl-1-pentene) and said solvent comprising bibenzyl.

2. A method according to claim 1, wherein said first temperature is a temperature within the range from about 220° to about 240° C. and wherein said solvent comprises also paraffin wax.

3. A method according to claim 2, wherein said second temperature is a temperature within the range from about 178° to about 182° C.

4. A method according to claim 3, wherein said third temperature is a temperature within the range from 158° to 162° C.

5. A method according to claim 4, wherein steps c through f are done without any agitation of said mixture and wherein said solvent consists of bibenzyl and paraffin wax in a relative weight ratio of bibenzyl: paraffin wax which is greater than 85:15.

6. A method according to claim 5 and including also the step of machining said machinable composition of matter which has been formed.

7. A method according to claim 6 and including also the step of leaching said bibenzyl from said machinable composition of matter so as to form a foam of poly(4-methyl-1-pentene).

8. A method according to claim 7, wherein said leaching is done by using a low molecular weight alcohol at about room temperature.

9. A method according to claim 5, wherein said solvent contains said paraffin wax in a relative amount of about 10 weight percent.

* * * * *